US 6,723,271 B2

(12) United States Patent
Hemphill et al.

(10) Patent No.: US 6,723,271 B2
(45) Date of Patent: Apr. 20, 2004

(54) METHOD AND APPARATUS FOR MAKING COMPOSITE PARTS

(76) Inventors: W. Scott Hemphill, 220 Upper Pike Creek Rd., Newark, DE (US) 19711; Carmen G. Hunter, 303 4th St., New Castle, DE (US) 19720; George E. Green, 308 3rd St., New Castle, DE (US) 19720; Philip M. DeNardo, 213 Llangolten Blvd., New Castle, DE (US) 19720; Kemal Hayati Catbas, 48 Llanfair Rd., Ardmore, PA (US) 19003

(*) Notice: Subject to any disclaimer, the term of this patent is extended or adjusted under 35 U.S.C. 154(b) by 390 days.

(21) Appl. No.: 09/846,815

(22) Filed: May 1, 2001

(65) Prior Publication Data

US 2002/0149134 A1 Oct. 17, 2002

Related U.S. Application Data

(60) Provisional application No. 60/284,071, filed on Apr. 16, 2001.

(51) Int. Cl.⁷ .......................... B29C 70/44; B29C 65/70
(52) U.S. Cl. .............. 264/510; 264/102; 264/249; 264/255; 264/257; 264/258; 264/511; 264/571; 156/245
(58) Field of Search ................ 264/510, 511, 264/512, 257, 258, 249, 255, 571, 102; 156/245

(56) References Cited

U.S. PATENT DOCUMENTS 4,267,147 A * 5/1981 Pogoda et al. .............. 264/571
4,622,091 A   11/1986 Letterman
4,902,215 A    2/1990 Seemann, III
4,942,013 A    7/1990 Palmer et al.
5,052,906 A   10/1991 Seemann
5,266,021 A   11/1993 Jacobson
5,665,301 A    9/1997 Alanko
5,721,034 A    2/1998 Seemann, III et al.
5,958,325 A    9/1999 Seemann, III et al.
6,638,466 B1 * 10/2003 Abbott ....................... 264/238

FOREIGN PATENT DOCUMENTS

JP      05-320381    * 12/1993
JP      04-070335    *  3/1995

* cited by examiner

Primary Examiner—Stefan Staicovici
(74) Attorney, Agent, or Firm—Boyle Fredrickson Newholm Stein & Gratz S.C.

(57) ABSTRACT

A method of making a composite part includes the steps of placing a first section of a fibrous pre-form in a mold and infusing the first section of the fibrous pre-form with a resin so as to produce a resin-infused portion and a non-resin-infused portion. Next, the method includes coupling the non-resin-infused portion to a second section of the fibrous pre-form to create a coupled non-resin-infused portion. Then, the coupled non-resin-infused portion is infused with resin to create a second resin-infused portion and a second non-resin-infused portion. These steps are repeated to separately infuse different sections of the part until the part is complete. The corresponding apparatus preferably employs a rigid mold having a shape defining only a portion of the composite part to be made. And, the method is particularly adapted to making both cored and non-cored structures that are large or unconventionally shaped.

22 Claims, 5 Drawing Sheets

METHOD AND APPARATUS FOR MAKING COMPOSITE PARTS

CROSS-REFERENCES TO RELATED APPLICATION

This application is the utility application which is based on Provisional Patent Application Serial No. 60/284,071 which was filed in the United States Patent and Trademark Office on Apr. 16, 2001 and which is entitled "Method And Apparatus For Making Composite Parts."

BACKGROUND OF THE INVENTION

1. Field of the Invention

The present invention is directed to forming composite parts and, more particularly, to a vacuum assisted resin transfer molding method and apparatus for forming composite parts by infusing different sections of the part to be formed separately and then joining the sections by an additional infusion process.

2. Description of the Related Art

Known methods and apparatus have been used to impregnate dry fibrous materials by introducing a resin to the material under vacuum conditions, and then curing the resin to produce the composite part. One particular method employing a vacuum bag molding process, or vacuum assisted resin transfer molding (VARTM) process, includes placing a fiber lay-up in a rigid mold having a shape corresponding to the composite part being produced. Notably, such processes take advantage of a desired amount of compression provided by a vacuum bag used to enclose the resin impregnated fiber lay-up under vacuum pressure. To promote uniform and complete "wet-out" of the fiber lay-up, the vacuum operates to remove entrapped air in the lay-up as its formed into the composite structure. As a result, such systems generally avoid the creation of areas of the lay-up that are not infused with resin, which can compromise the structural integrity of the part. After wetting-out the fiber, the resin is then cured to complete the structure.

The lay-ups used in known systems for manufacturing solid and cored laminate composite structural members are typically made from glass or carbon fiber or polyester cloth. To enhance structural characteristics of the member, such systems typically employ a number of plies of such fiber-reinforced material. Notably, known vacuum assisted resin transfer molding processes have been used to manufacture non-cored structures, as well as cored structures that include a core material disposed in the lay-up.

With more particular reference to making non-cored structures, a fibrous lay-up is initially placed in a self-contained mold having a desired shape. Then, typically, a resin distribution medium is placed on top of the lay-up. The medium separates the lay-up from a structure for maintaining vacuum pressure in the system, such as a flexible vacuum bag, and facilitates flow of uncured resin in the system by providing flow paths between the bag and the lay-up. The vacuum bag is fluid impervious and sealed to allow applied vacuum pressure to pull the resin through the fibrous lay-up, as noted previously. Also, a resin inlet is disposed, preferably, adjacent to the vacuum bag with the bag being sealed thereto to maintain vacuum pressure.

Similar apparatus is used to manufacture cored structures. However, the fibrous lay-up employed in manufacturing cored structures includes, typically, fiber-wrapped core structures made of, for example, balsa wood. As with the non-cored structures, the lay-up is then placed in a rigid mold and a vacuum bag is placed thereon to maintain vacuum pressure. Further, a distribution medium may be employed, either between the core structures and the fibrous material wrapped thereon, or between the fiber wrapped cores and the vacuum bag, to promote uniform resin flow upon application of vacuum pressure. For both cored and non-cored structures, the resin is then cured and the composite part and the rigid mold are separated.

One challenge presented by such processes is that during manufacturing, the weight of the structure typically becomes extreme, and the fibrous lay-up including the layers of fiber-reinforced material exhibits poor resin flow characteristics. Improvements in known apparatus and methods for impregnating fiber-reinforced resin have included using a fibrous lay-up comprising a filament winding that orients the fibers to facilitate more efficient resin flow. Moreover, to further facilitate uniform wet-out, a distribution medium may also be employed to distribute the resin during impregnation. However, known vacuum assisted resin transfer molding methods still have inherent drawbacks.

One disadvantage of known vacuum assisted resin transfer molding processes, whether used for forming cored or non-cored structure, is that large structures and structures having unconventional shapes are difficult to manipulate and extract from the self-contained molds employed. For example, in one application of particular interest, a number of problems arise when making hollow tubular composite structures using vacuum assisted resin transfer molding processes. In one known VARTM method, an inflatable bladder is employed as a temporary mold core. Further, dry fiber-reinforced fabric is disposed around the bladder intermediate the bladder and an outer rigid tubular mold. In this case, the bladder is inflated to press the fibrous pre-form against the outer mold during resin infusion.

After curing the resin as described above, the bladder must be removed. Unfortunately, for large structures, there is a large volume of air contained by the bladder, especially in view of the fact that the pressure must be maintained at a significant level to support the dead weight of the fibrous pre-form and the associated resin. In the event that the bladder bursts, the outcome can be a significant change in air pressure in the building in which the composite part is being manufactured. This instantaneous change in air pressure can be extremely dangerous. As a result, such known systems have been capable of producing only relatively small diameter tubes. Because it would be desirable to make composite tubes having, for example, a six foot diameter, a new technique was required.

Similar problems are encountered when attempting to produce complex shapes, especially large complex shapes. The tooling for such structures becomes prohibitively expensive, and the resulting composite structures are difficult to remove from the tooling. Moreover, in some cases, the large structures cannot be removed from the mold at all. In that case, the mold typically must be broken away or otherwise separated from the completed composite part, thus compromising repeatability and increasing expense.

In view of the above drawbacks, the art of manufacturing resin-infused composite structures was in need of an improved method and apparatus for producing large structures, especially closed form structures and structures having odd shapes. The method and apparatus should ensure uniform resin wet-out of the fibrous pre-form, and maintain the overall integrity of the composite part being produced. Further, the tooling required for such a method and apparatus should also be cost effective and allow ready manipulation of the composite part being produced.

OBJECTS AND SUMMARY OF THE INVENTION

The preferred embodiment is directed to a method and apparatus of producing a composite part by separately infusing and curing different sections of a fibrous pre-form using a rigid mold having a shape corresponding to only a portion of the part to be formed. The method preferably includes forming two or more different sections of the composite part so that the sections include a non-resin-infused portion that can be subsequently and iteratively coupled, and then infused with resin to complete the part. As a result, tooling for the method and apparatus is minimized, and the integrity of the part being produced can be readily monitored. Notably, the method and apparatus of the preferred embodiment is particularly adapted to producing large composite parts and parts having unusual shapes.

According to a first aspect of the preferred embodiment, a method of making a composite part includes the steps of placing a first section of a fibrous pre-form in a mold and infusing the first section of the fibrous pre-form with a resin so as to produce a resin-infused portion and a non-resin-infused portion. Next, the method includes coupling the non-resin-infused portion to a second section of the fibrous pre-form to create a coupled non-resin-infused portion. Then, the coupled non-resin-infused portion is infused to create a second resin-infused portion and a second non-resin-infused portion.

In another aspect of the preferred embodiment, the method further includes translating the first section in the mold prior to the coupling step, and repeating the translating, coupling and second infusing steps until the composite part is complete.

According to another aspect of the preferred embodiment, the first and second sections of the fibrous pre-form each includes a plurality of layers of fiber-reinforced fabric, and wherein the coupling step includes stacking at least a portion of the layers of the non-resin-infused portion with at least a portion of the layers of the second section.

According to a still further aspect of the preferred embodiment, the fibrous pre-form includes a splicing section having a plurality of layers of fiber-reinforced fabric, and the coupling step includes stacking the layers of the splicing section with the layers of the first and second section.

In yet another aspect of the preferred embodiment, a method of making a composite part includes the steps of forming a first structure, the first structure including a fiber-reinforced material having a resin-infused portion and a non-resin-infused portion. The method also includes forming a second structure, the second structure including a fiber-reinforced material having a resin-infused portion and a non-resin-infused portion. Next, the method includes coupling the first and second non-resin-infused portions to create a coupled non-resin-infused portion. Then, the coupled non-resin-infused portion is infused with a resin and cured.

According to another aspect of the preferred embodiment, an assembly for forming a composite part includes a fibrous pre-form having first and second sections. The assembly also includes a rigid mold adapted to support said pre-form and having a shape corresponding to only a portion of the part, and a bleed channel positioned to wet out the first section with a resin so as to create a resin-infused portion and a non-resin-infused portion of the first section. In addition, the non-resin-infused portion is adapted to be stacked with a portion of the second section.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The present invention will become more fully understood from the following detailed description, taken in conjunction with the accompanying drawings, wherein like reference numerals refer to like parts, in which.

DESCRIPTION OF THE PREFERRED EMBODIMENT

Initially, the drawings described below illustrate forming a tubular composite part according to a method of the preferred embodiment. However, the technique of the apparatus and method of the preferred embodiment is not intended to be limited to forming tubular composite parts; rather, the below described technique is useful for making any large or unusually shaped structure desired.

Figure 1:
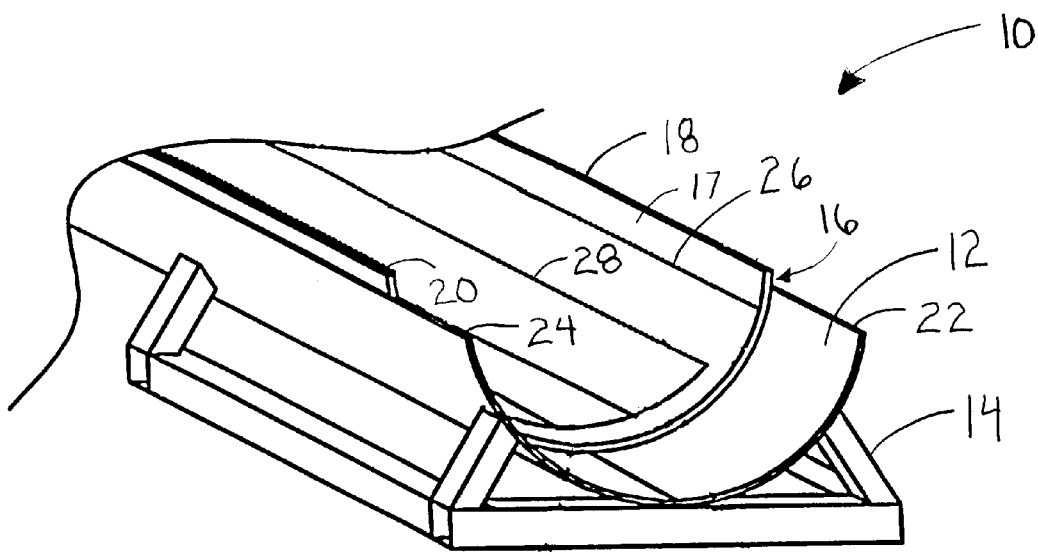
FIG. 1 is a partially broken away schematic perspective view of an assembly for making a composite part according to the preferred embodiment.

Turning initially to FIG. 1, in order to form a large diameter (e.g., six feet) tubular structure, an apparatus 10 preferably includes a rigid mold 12 having a shape corresponding to a portion of the tubular structure. Preferably, mold 12 has a semicircular shape defining an appropriate associated radius (e.g. three feet). To support rigid mold 12, and the components of the composite part being formed therein, a frame 14 having a shape corresponding to the contours of mold 12 is employed.

To form the part, a fibrous pre-form 16 including one or more layers or plies of fiber-reinforced fabric (see, e.g., FIG.

3) is placed in mold 12. Each ply of the fabric is positioned in mold 12 so that the pre-form 16 aligns with the center line of the mold, and the generally opposed edges 18, 20 extend above the edges 22, 24 of mold 12, respectively. Preferably, the fabric extends above mold 12 by a couple of inches on both sides. Thereafter, subsequent layers of the fibrous pre-form are disposed on one another such that the layers are contiguous and flush with one another at each end along their length.

Notably, fibrous pre-form 16 may include one or more cores, made of, for example, balsa wood, foam, etc., as is conventional in the art. Such cores (not shown) are disposed intermediate at least some of the layers of the pre-form 16. Also, in the preferred embodiment, the fiber-reinforced fabric is a glass fiber-reinforced fabric, such as stitch-bonded fabric. Alternatively, the pre-form may comprise fiber rovings, a fiber-reinforced mat or fiber chop, depending on the user's specifications.

Next, a peel-ply layer 26 may be placed on fibrous pre-form 16 so as to allow the components of the forming assembly of the VARTM system to be readily removed from the cured part. The peel-ply layer is permeable to the flowable resin that is pulled within the system under vacuum pressure, as discussed below. Notably, the peel-ply layer is optional, depending upon a variety of factors such as the type of resin used, etc. On top of peel-ply layer 26, preferably, a distribution medium layer 28 defining structure for "spreading" the resin is placed to facilitate ready distribution of the resin input to the system, particularly towards the lengthwise edges of pre-form 16.

Figure 2:
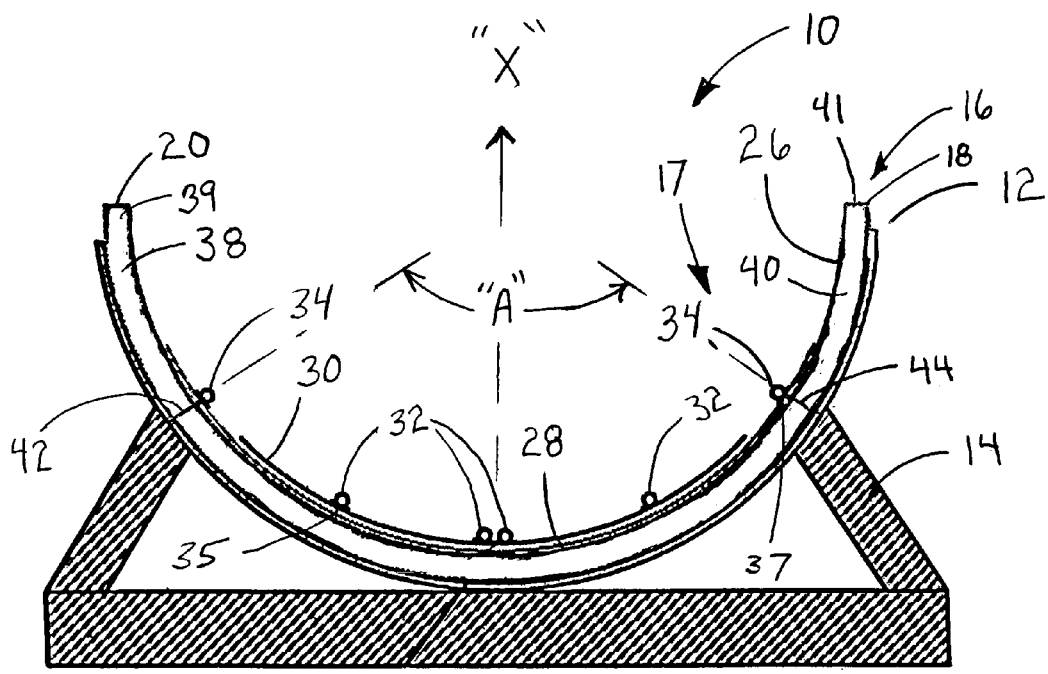
FIG. 2 is a schematic cross-sectional view of the assembly for making a composite part according to the preferred embodiment.

Turning to FIG. 2, the assembly 10 for forming the tubular composite part preferably further includes, although does not require, a breather fabric 30 placed on distribution medium 28 to act as a sponge for excess resin pulled during the VARTM process. The breather fabric 30 promotes uniform and complete wet-out of the fiber-reinforced fabric as the excess resin tends to move towards the bleed channels (described below). In particular, because resin near the top of the pre-form tends to be pulled from the pre-form under vacuum pressure during process, breather fabric 30 operates as a buffer layer. Notably, unlike the pre-form, it does not matter if resin is pulled entirely through this buffer layer, as the buffer layer does not comprise part of the completed structure. As a result, breather fabric 30 generally insures that the top portion of pre-form 16 remains infused with resin.

Next, still referring to FIG. 2, a plurality of feed channels 32 are disposed adjacent to distribution medium layer 28 and extend along the length of the pre-form 16 to evenly feed the assembly with resin. Preferably, feed channels 32 are omega channels that comprise elongated tubes having a slit 35 along their length to allow resin to be dispensed therefrom the entire length of the tube. Alternatively, feed channels 32 may comprise pervious springs or pope, or other suitable structure. Further, feed channels 32, in this application of the preferred embodiment, are preferably spaced symmetrically about the center line "X" of the rigid mold to promote uniform distribution of the input resin. Next, a plurality of bleed channels 34 for "pulling" vacuum on the assembly are also disposed adjacent to distribution medium 28. For reasons discussed below, channels 34 are disposed inwardly from edges 18, 20 of pre-form 16. For example, to produce a six-foot diameter tube, bleed channels 34 are preferably disposed approximately two feet from edges 18, 20, along the contour of pre-form 16. Again, similar to feed channels 32, bleed channels 34 are preferably Omega channels extending along the length of the mold and having a slit 37 along that length. Therefore, the slit in bleed channels 34 pulls vacuum, and thus excess resin, along the entire length of the channel. Bleed channels 34 are also preferably disposed symmetrically about the center line "X" of the rigid mold 12.

The entire assembly is then sealed to ensure that vacuum pressure is maintained, as is conventional in the art. For example, a vacuum bag (not shown) may be placed around the entire structure and sealed to rigid mold 12 with a pliable sealant such as a tacky tape (not shown).

Figure 3:
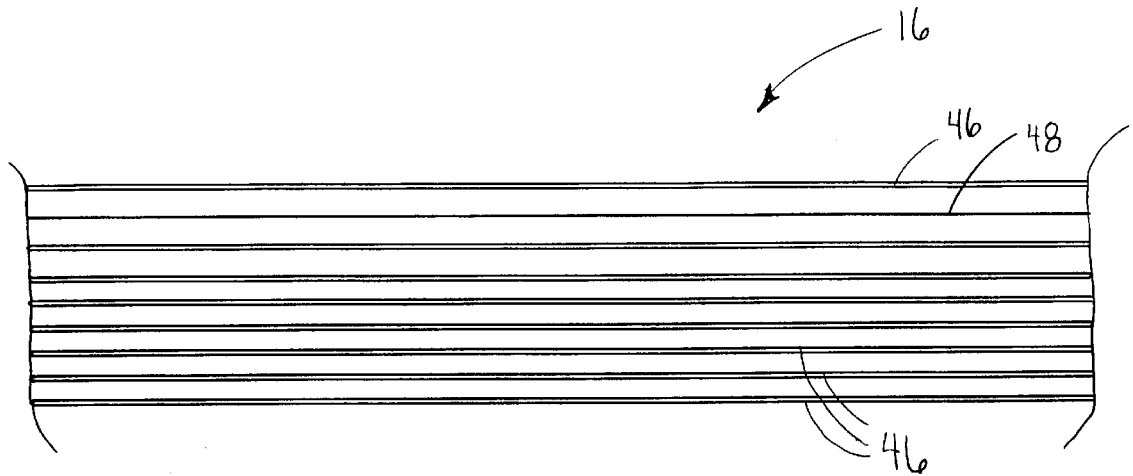
FIG. 3 is a schematic end view of the fibrous pre-form shown in FIG. 1, illustrating the layers of the fibrous pre-form.

A more detailed illustration of a portion of the fibrous pre-form 16 shown in FIGS. 1 and 2 is shown in FIG. 3. In particular, a plurality of two-ply layers 46 of glass stitch-bonded fabric are stacked or layered on one another to assemble the pre-form. Notably, two-ply layers may be intermixed with single-ply layers 48 to form the fibrous lay-up 16. Stacking multiple two-ply layers can cause the layers of infused fabric to be unbalanced. As a result, when the resin cures, particularly near the top of pre-form 16 adjacent to the vacuum bag, the cured resin pulls on the fibers of the layers and can cause warping of the cured pre-form, also known as "potato-chipping." By combining two-ply layers 46 with single-ply layers 48, the forces exerted across the layers are distributed more uniformly. This uniform pressure across the layers 46 helps to prevent potato-chipping.

Also, in this embodiment, the layers 46, 48 are positioned in mold 12 so that the centerline of each ply is aligned with the centerline of mold 12. Layers 46 are shown separated for illustration purposes only. When assembled, layers 46 are sandwiched generally adjacent to one another with no space in between.

Figure 4:
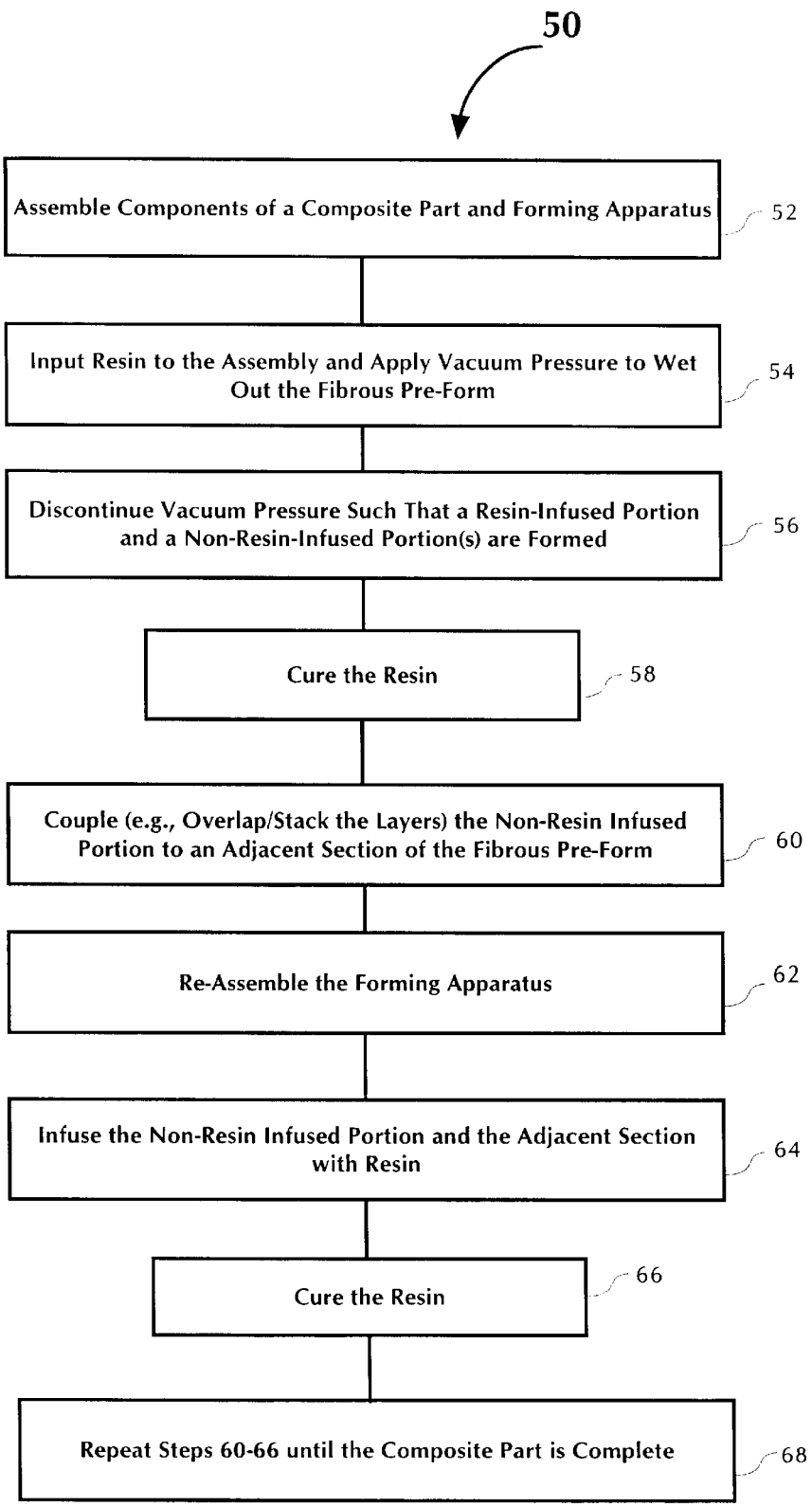
FIG. 4 is a flow chart setting forth the steps for making a composite part according to a method of the preferred embodiment.

Turning to FIG. 4, a flow chart illustrating a method 50 of the preferred embodiment for forming a composite part with the above-described apparatus is shown. Note that method 50 is described in conjunction with FIGS. 2, 3 and 5–8 to illustrate forming a tubular composite part. Initially, method 50, in Step 52, assembling the components of apparatus 10, including at least some elements of the composite part (including the layers of a first section 17 of fibrous pre-form 16), and the forming apparatus (including, for example, mold 12, peel-ply layer 26, distribution medium 28, breather fabric 30, feed and bleed channels 32, 34, and the vacuum bag) as shown and described above in conjunction with FIGS. 1 and 2. Next, in Step 54, resin is input to the system via the feed channels (32 in FIG. 2), so that resin flows and is introduced to the fibrous pre-form 16 along its entire length. To fully infuse the fabric, vacuum pressure is applied (preferably simultaneously) to "pull" the resin through the lengthwise slot in the feed channels, and into the distribution medium for distributing the resin along, in this case, the top surface of fibrous pre-form 16, in Step 54.

Under vacuum pressure, the resin flows through the peel-ply (if used) and into the layers of the stitch-bonded fabric (46, 48 in FIG. 3) of fibrous pre-form 16. As a result, the layers of fiber are impregnated as the resin tends to move towards the bleed channels (34 in FIG. 2). By the appropriate selection of manufacturing parameters, including the position of bleed channels 34, the flow of resin wets-out the pre-form. Moreover, importantly, the resin does not extend beyond bleed channels 34, thus creating a resin-infused portion 36 and a pair of non-resin-infused portions 38, 40 of the fibrous pre-form 16 when application of vacuum pressure is discontinued in Step 56. Notably, using method 50, a pair of interfaces 42, 44 between resin-infused portion 36 and the first and second non-resin-infused portions 38, 40, respectively, define a relatively sharp discontinuity. By then curing the resin in Step 58, a specifically defined section "A" (as shown in FIG. 2) of the composite part to be formed is complete.

Method 50 next includes, in Step 60, coupling one the non-resin-infused portions (e.g., 40 in FIG. 2) of first section 17 of fibrous pre-form 16 with a second or adjacent section of fibrous pre-form 16. In particular, step 60 preferably includes overlapping or stacking the layers of one of the non-resin infused portions (e.g., 40) of first section 17 with at least one layer, and preferably several layers, of stitch-bonded fabric of the second adjacent section.

Figure 5:
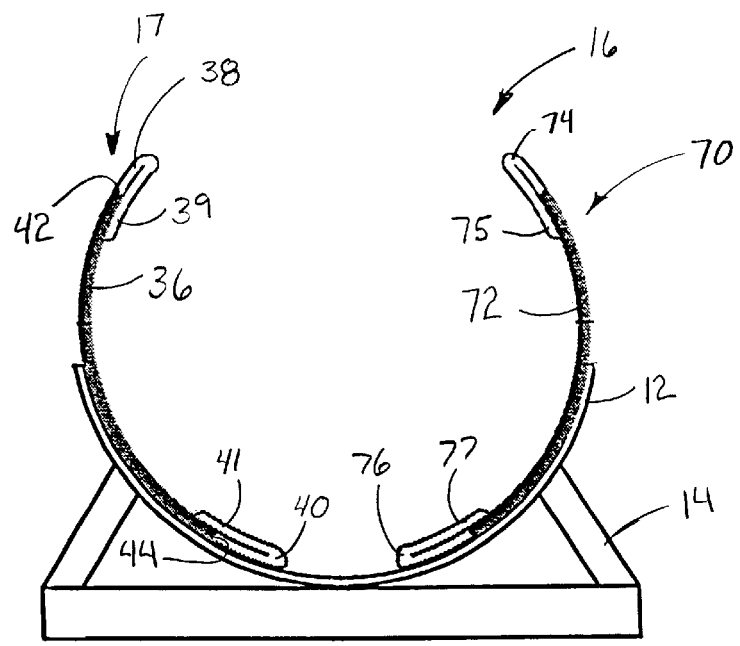
FIG. 5 is a schematic cross-sectional view similar to FIG. 2, illustrating two partially-infused composite parts placed in a rigid mold, each including a resin-infused portion and non-resin-infused portions.

For example, with reference to FIG. 5, using the above-described steps (Steps 52–58), similar to first section 17, a second section 70, is infused with resin to create a resin-infused portion 72 and a pair of non-resin-infused portions 74, 76. As a result, after curing in Step 58, sections 17, 70 are selectively infused with resin so as to include opposed non-resin-infused free ends 39, 41 and 75, 77, respectively, each coupled by a resin-infused portion 36, 72, respectively.

Figure 6:
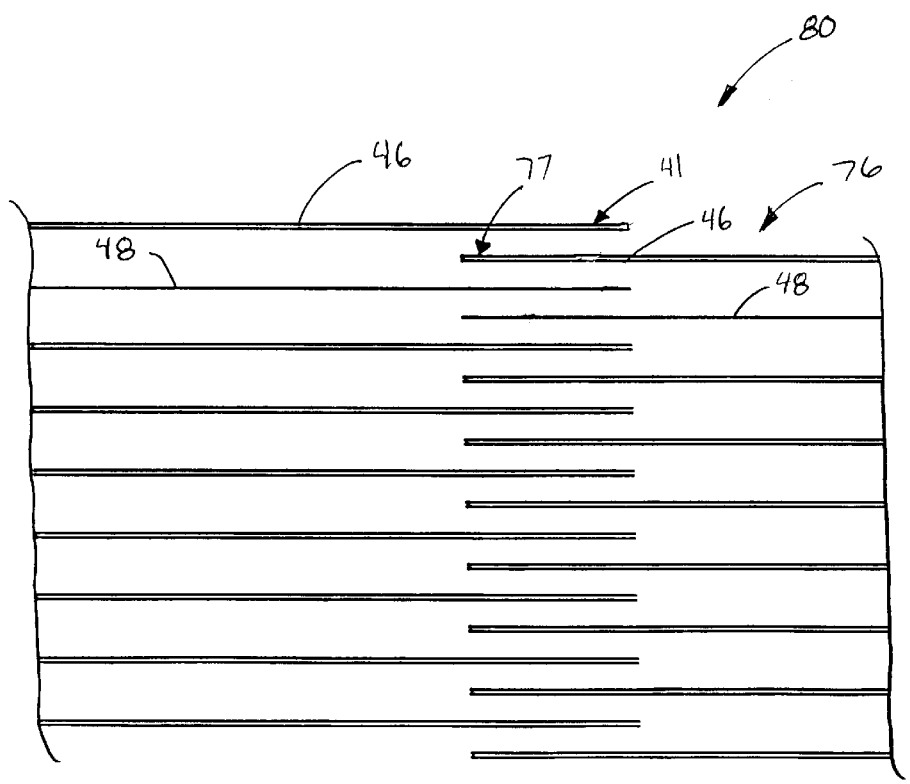
FIG. 6 is a schematic end view of the fibrous pre-form, similar to FIG. 3, illustrating overlapping layers of at least some of the non-resin-infused portions of the fibrous pre-form shown in FIG. 5.

Then, as part of stacking step (Step 60), each of the partially infused sections 17, 70 of the pre-form of the composite part are placed in rigid mold 12 and positioned or translated so that one of their non-resin-infused portions (for example, 40 and 76 of sections 17 and 70, respectively) can be coupled by overlapping the layers of those non-resin-infused portions. As shown in FIGS. 5 and 6, the free ends 41, 77 of non-resin-infused portions 40, 76 are overlapped to link the two and create a coupled non-resin-infused portion 80 (FIG. 6). Then, the remaining components of the assembly including the peel-ply, distribution medium, breather fabric and vacuum bag may be assembled in Step 62. In Step 64, the coupled non-resin-infused portion 80 is infused with resin. Notably, after curing the resin-impregnated section 80 in Step 66, a portion 82 (see FIG. 7) of the circumference of the tubular composite part being formed may have a greater thickness than the remaining resin-infused portions around the circumference of the composite part. This change in the thickness of the tube around its circumference is typically acceptable.

In Step 68, after curing the infused portions 36, 40, 72, 76 of the pre-form 16 shown in FIG. 5, the uncompleted composite part can then be completed by repeating above-described Steps 60–66 for additional sections of pre-form 16. For example, partially completed sections 17, 70 can be positioned, e.g., rotated within mold 12 so that the other of the non-resin-infused portions (38 and 74) of the individual partially formed sections 17, 70 of the fibrous pre-form 16 can be coupled. In this example, the free ends 39, 75 of non-resin-infused regions 38, 74 are not sufficiently long to overlap each other, and thus, a splice section of fibrous lay-up is required.

Figure 7:
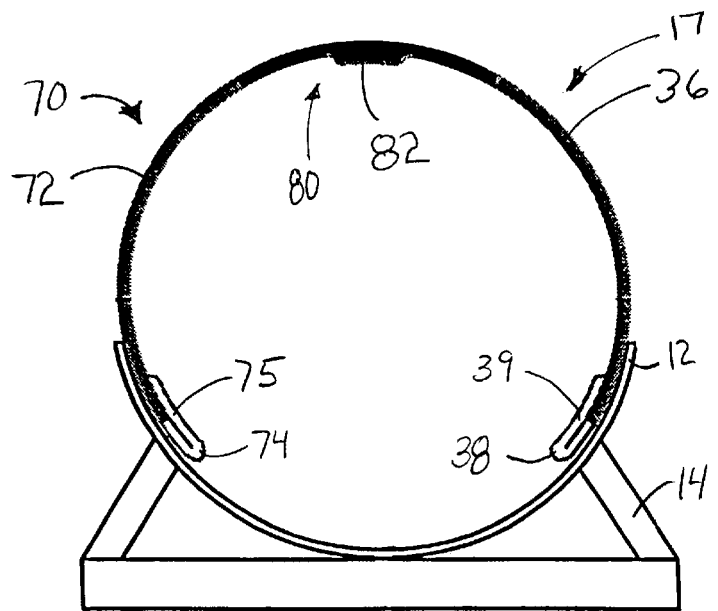
FIG. 7 is a schematic cross-sectional view similar to FIGS. 2 and 5, illustrating two composite parts coupled, infused and cured at corresponding ones of their two opposed ends, with the other of the opposed ends adapted to be coupled and subsequently infused with resin.
Figure 8:
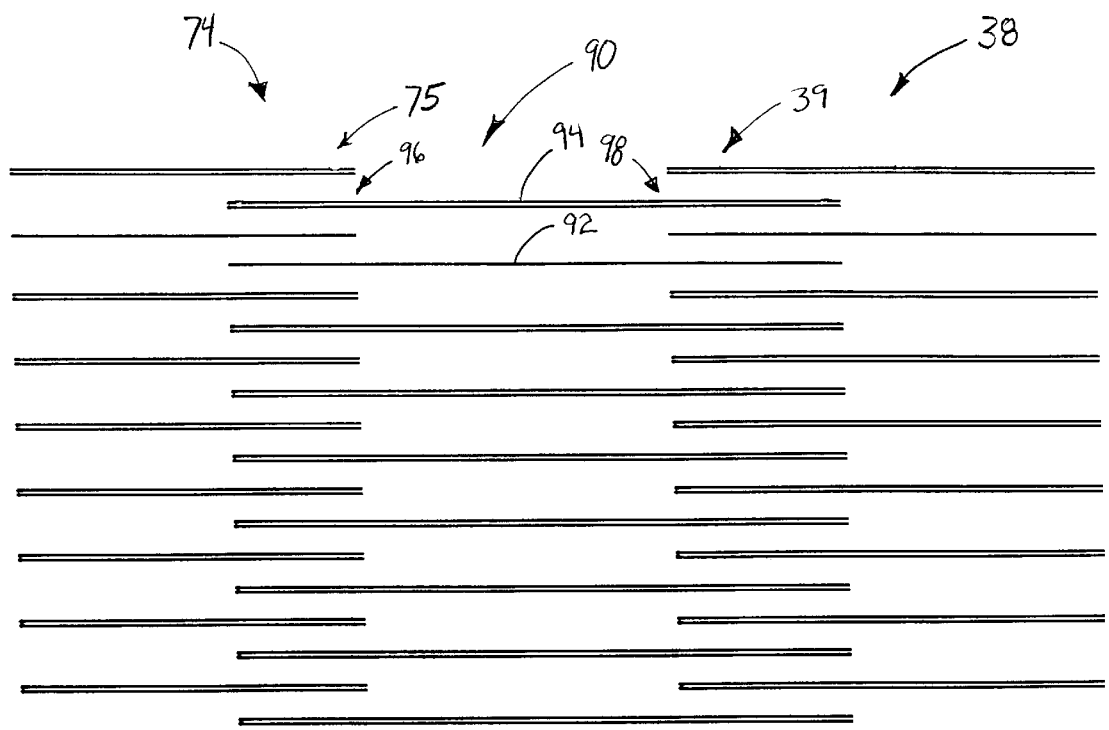
FIG. 8 is a schematic end view of the fibrous pre-form, similar to FIGS. 3 and 6, illustrating overlapping layers of the non-resin-infused portions shown in FIG. 7 and a splicing section.

As shown in FIG. 8, a splice section 90 of fibrous pre-form 16 includes a plurality of layers of single and two-ply stitch-bonded fabric 92, 94, respectively, each having opposed free ends 96, 98 adapted to be overlapped with the free ends 39, 75 of the non-resin-infused portions 38, 74 shown in FIGS. 6 and 7 (Step 60). Again, the remaining components of the VARTM apparatus can then be assembled on the splicing section 90 (Step 62) and the non-resin-infused sections 38, 74 of fibrous pre-form 16 so that the dry fabric can be infused with resin and thereafter cured to complete the tubular structure, as described previously (Steps 64 and 66). Similar to region 82 shown in FIG. 7, the splice section may create two additional regions (not shown) where the thickness of the tubular structure is greater than the thickness of the remainder of the structure, due to the overlapping of the layers of stitch-bonded fabric. By successively infusing different sections of the pre-form 16 of the composite part to be formed, the preferred embodiment employs tooling corresponding to only a part of the shape to be made, thus facilitating cost-effectiveness. Further, the method and apparatus of the preferred embodiment achieves uniform and complete wet-out of the entire pre-form 16, while avoiding the complications of forming large or unusually shaped structures, as well as the dangers and other drawbacks of known systems.

While the embodiments illustrated in the figures and described above are presently preferred, it should be understood that these embodiments are offered by way of example only. For example, the preferred embodiment is adapted to coupling and infusing with resin portions of the composite part in any of the three orthogonal dimensions defining the part. Overall, the invention is not intended to be limited to any particular embodiment, but is intended to extend to various modifications that nevertheless fall within the scope of the appended claims.

What is claimed is:

1. A method for making a composite part, the method comprising:

forming a first structure, the first structure including a fiber-reinforced material having an interface defined by a relatively sharp discontinuity between a resin-infused portion and a non-resin-infused portion;

forming a second structure, the second structure including a fiber-reinforced material having an interface defined by a relatively sharp discontinuity between a resin-infused portion and a non-resin-infused portion;

coupling the non-resin-infused portions of the first and second structures to create a coupled non-resin-infused portion;

infusing the coupled non-resin-infused portion with a resin; and curing the resin to couple the first and second structures.

2. The method of claim 1, wherein said first and second forming steps include selectively applying vacuum pressure.

3. The method of claim 2, wherein said selectively applying vacuum pressure step includes positioning a bleed channel inward from an edge of the material.

4. The method of claim 1, wherein said first and second forming steps include placing the corresponding fiber-reinforced material in a rigid mold and selectively infusing a portion of the fiber-reinforced material.

5. The method of claim 4, wherein said coupling step includes positioning the first and second structures in the mold so that the first and second non-resin-infused portions overlap.

6. The method of claim 1, further including the step of splicing the first and second non-resin-infused portions with a splicing section of a fiber-reinforced material.

7. The method of claim 6, wherein the fiber-reinforced material of the first and second structures includes a plurality of layers of fiber-reinforced material, and the fiber-reinforced material of the splicing section has opposed ends and includes a plurality of layers of fiber-reinforced material.

8. The method of claim 7, wherein said splicing step includes stacking at least a portion of the layers of fiber-reinforced material of each non-resin-infused portion with at least a portion of the layers of corresponding ones of the opposed ends to create a stacked non-resin-infused portion.

9. The method of claim 8, further including the steps of:
infusing the stacked non-resin-infused portion with resin; and
curing the resin.

10. The method of claim 7, wherein a core is positioned between at least some of the layers of fiber-reinforced material.

11. The method of claim 1, wherein the composite part is a closed-form composite part.

12. The method of claim 1, wherein the fiber-reinforced material is stitch-bonded fabric.

13. The method of claim 1, wherein the resin-infused portion is contiguous with the non-resin-infused portion, and the interface between the resin-infused portion and the non-resin-infused portion is generally planar.

14. A method for making a composite part, the method comprising:
placing a first section of a fibrous pre-form in a mold;
infusing the first section with a resin so as to produce an interface defined by a relatively sharp discontinuity between a first resin-infused portion and a first non-resin-infused portion;
coupling the first non-resin-infused portion to a second section of the fibrous pre-form to create a coupled non-resin-infused portion;
infusing the coupled non-resin-infused portion with resin to create a second resin-infused portion and a second non-resin-infused portion; and
allowing the resin to cure to couple the first and second sections.

15. The method of claim 14, wherein said coupling step includes translating the first section in the mold.

16. The method of claim 15, further including the step of repeating said translating, coupling and second infusing steps until the composite part is complete.

17. The method of claim 14, wherein the fibrous pre-form includes a fiber-reinforced fabric.

18. The method of claim 17, wherein the fiber-reinforced fabric is stitch-bonded fabric.

19. The method of claim 17, wherein the first and second sections of the fibrous pre-form each includes a plurality of layers of the fiber-reinforced fabric.

20. The method of claim 19, wherein said coupling step includes stacking at least a portion of the layers of the non-resin-infused portion with at least a portion of the layers of the second section.

21. The method of claim 19, wherein the pre-form includes a third section having a plurality of layers of fiber-reinforced fabric, and wherein the second section is a splicing section having opposed ends, and wherein said coupling step includes stacking at least a portion of the layers of the splicing section with at least a corresponding portion of the layers of the first and third sections.

22. The method of claim 14, wherein the fibrous pre-form includes a core.

* * * * *